United States Patent [19]

Decker, Jr. et al.

[11] Patent Number: 5,593,654
[45] Date of Patent: *Jan. 14, 1997

[54] PREPARATION OF STABILIZED ALUMINA HAVING ENHANCED RESISTANCE TO LOSS OF SURFACE AREA AT HIGH TEMPERATURES

[75] Inventors: Lewis B. Decker, Jr., Lago Vista; Kevin J. McLaughlin, Austin, both of Tex.

[73] Assignee: CONDEA Vista Company, Houston, Tex.

[ * ] Notice: The term of this patent shall not extend beyond the expiration date of Pat. No. 5,531,976.

[21] Appl. No.: 392,029

[22] Filed: Feb. 22, 1995

Related U.S. Application Data

[63] Continuation of Ser. No. 145,652, Oct. 27, 1993, abandoned, which is a continuation of Ser. No. 849,882, Mar. 12, 1992, abandoned.

[51] Int. Cl.$^6$ ................................................. C01F 7/02
[52] U.S. Cl. ................................... 423/625; 423/628
[58] Field of Search ........................ 423/628, 625; 252/315.7

[56] References Cited

U.S. PATENT DOCUMENTS

| | | | |
|---|---|---|---|
| 3,956,186 | 5/1976 | Iwase et al. | 252/455 R |
| 4,220,559 | 9/1980 | Polinski | 502/303 |
| 4,248,852 | 2/1981 | Wakabayashi et al. | 423/626 |
| 4,261,862 | 4/1981 | Kinoshita et al. | 252/462 |
| 4,528,279 | 7/1985 | Suzuki et al. | 502/200 |
| 4,676,928 | 6/1987 | Leach et al. | 423/630 |
| 4,677,095 | 6/1987 | Wan et al. | 502/263 |
| 4,711,872 | 12/1987 | Kato et al. | 502/328 |
| 4,722,920 | 2/1988 | Kimura et al. | 502/439 |
| 4,771,028 | 9/1988 | Arai et al. | 502/341 |
| 4,791,091 | 12/1988 | Bricker et al. | 502/303 |
| 4,843,056 | 6/1989 | Matsumoto et al. | 502/302 |
| 4,859,433 | 8/1989 | Pereira et al. | 423/212 |
| 4,861,410 | 8/1989 | Clark et al. | 252/315.7 |
| 5,055,019 | 10/1991 | Meyer et al. | 423/628 |

OTHER PUBLICATIONS

Technical Information, Etrusion of CATAPAL Alumina by Vista Chemical Co. Mizukami, *Nippon Kagaku Kaishi*, No. 9, 1542 (1988), no month.
Machida, et al. *J. Am. Ceram. Soc.* 71 (12), 1142 (1989), no month.

*Primary Examiner*—Steven Bos
*Attorney, Agent, or Firm*—Browning Bushman

[57] ABSTRACT

A process for preparing stabilized alumina having increased surface area retention at high temperature in which a gel of a boehmite alumina which has been obtained by hydrothermally treating an aqueous mixture of a precursor boehmite alumina having a pH of from about 5 to about 9 for a period of time sufficient to convert the greater portion of the precursor boehmite alumina to a colloidal sol is subjected to working as, for example, by using a sufficient shearing force for a sufficient period of time to produce a worked boehmite alumina which has an increase in pore volume of at least about 30 percent and an increase of median pore radius of at least about 20 percent, a stabilizer being added to the boehmite alumina, the stabilizer being an oxide of a metal such as barium or a metal included in the lanthanide series of metals or a compound of such metals which converts to an oxide at elevated temperatures.

11 Claims, No Drawings

PREPARATION OF STABILIZED ALUMINA HAVING ENHANCED RESISTANCE TO LOSS OF SURFACE AREA AT HIGH TEMPERATURES

This is a continuation of U.S. application Ser. No. 08/145,652, filed on Oct. 27, 1993, now abandoned, which is a continuation of U.S. application Ser. No. 07/849,882, filed on Mar. 12, 1992, now abandoned.

BACKGROUND OF THE INVENTION

1. Field of the Invention

The present invention relates to a process for producing alumina which can be converted to catalyst supports exhibiting enhanced resistance to loss of surface area when subjected to high temperatures.

2. Description of the Background

One of the key requirements of a catalyst support or substrate such as alumina ($Al_2O_3$) is high surface area. Increased surface area allows for deposition of the catalytically active species, enhances reactivity between the catalytically active species and the reactants and, in general, makes for a more efficient catalyst support. In the case of catalyst supports of alumina used in catalytic converters for automobiles, i.e. autocatalyst supports, high surface area is particularly desirable because of short residence times between reactants and catalytic species, the desire to minimize the size of the catalytic converter and hence the need for a high efficiency catalyst.

A particular problem with autocatalyst supports involves the high temperatures to which the supports are subjected. High temperatures deleteriously effect the structural integrity of the catalyst support resulting in a loss of surface area. In effect, the elevated temperatures cause the catalyst to collapse on itself.

It is known that stabilizers such as oxides of barium and the lanthanide series of elements can stabilize autocatalysts in the sense that the loss of structural integrity of the support is retarded. In particular, oxides of barium, lanthanum or other lanthanide elements have been used in alumina based autocatalyst supports as heat stabilizers.

SUMMARY OF THE INVENTION

It is therefore an object of the present invention to provide a process for producing stabilized alumina which can be used in catalyst supports and other structural substrates requiting high surface area.

Still another object of the present invention is to provide a catalyst support exhibiting enhanced resistance to structural degradation at high temperatures.

The above and other objects of the present invention will become apparent from the description given herein and the appended claims.

According to the process of the present invention, a stabilized alumina of enhanced resistance to high temperature surface area loss is prepared by forming a gel of a boehmite alumina, the boehmite alumina being obtained by hydrothermally treating an aqueous mixture of a precursor boehmite alumina having a pH of from about 5 to about 9 for a period of time sufficient to convert the greater portion of the precursor boehmite alumina to a colloidal sol. The gel is subjected to working, i.e. by using a sufficient shearing force for a sufficient period of time to produce a worked boehmite alumina and increase the pore volume by at least 30 percent and the median pore radius by at least 20 percent. A stabilizer is added to the boehmite alumina, the stabilizer being an oxide of a metal such as barium or a metal included in the lanthanide series of metals or a compound of such metals which converts to an oxide at elevated temperatures. Mixtures of such stabilizers can be employed if desired, the amount of the stabilizer used being sufficient to decrease loss of surface area of a calcined alumina produced from the worked alumina.

In an optional embodiment of the invention, the stabilizer can be added to a calcined product obtained by calcining the worked (sheared) boehmite alumina.

DETAILED DESCRIPTION OF THE PREFERRED EMBODIMENT

In co-pending application Ser. No. 07/849,747, filed Mar. 12, 1992, and incorporated herein by reference for all purposes, there is disclosed and claimed a process for increasing the porosity of a boehmite alumina. As set forth in the aforementioned co-pending application, a precursor boehmite alumina is hydrothermally treated according to the process disclosed in U.S. Pat. No. 4,767,928, incorporated herein by reference for all purposes, to produce the staring material boehmite used in the process of the aforementioned co-pending application and the process of this invention. Briefly, in the process described in co-pending application Ser. No. 07/849,747, the starting material boehmite is gelled (viscosified), and worked as by shearing to produce an alumina of increased porosity.

In the present process, as the starting material boehmite, a colloidal sol can be employed. Alternatively, a colloidal sol which has been dried to form a dried powder can be formed into an aqueous dispersion/slurry and used. In either event, the alumina content will range from about 15 to about 55 percent-by-weight calculated as $Al_2O_3$, depending on whether or not a gelling agent is employed. In cases where a gelling agent is employed, the gel will normally contain from about 15 to about 25 percent-by-weight $Al_2O_3$. In the absence of a gelling agent, the gel will generally contain from about 35 to about 55 percent-by-weight $Al_2O_3$.

The process of the present invention includes the addition of a stabilizer to a boehmite alumina which has been worked, i.e. sheared, as described above. The term "stabilizer" or "stabilization", as used herein and with reference to the alumina obtained by the process of co-pending application Ser. No. 17/849,747, refers to a compound or process which acts to decrease or retard loss of surface area when the alumina, calcined to $Al_2O_3$, is subjected to elevated temperatures, i.e. 1000° C. or greater, generally 1200° C. or greater. The stabilizer can be an oxide of barium, an oxide of a lanthanide metal such as lanthanum, cerium, etc., a compound of barium which is converted to an oxide upon heating at an elevated temperature or a compound of a lanthanide metal which is converted to an oxide at an elevated temperature. Especially preferred stabilizers are oxides or barium or lanthanum, or a compound of barium or lanthanum which is converted to an oxide upon heating at an elevated temperature. In the more preferred method, a compound of barium or a lanthanide metal which can be converted to the oxide is used rather than the oxide thereof. This permits the stabilizer to be incorporated in the form of an aqueous solution or dispersion ensuring more uniform distribution of the stabilizer throughout the alumina.

The stabilizer may be added at various points in the process. For example, the stabilizer can be added to the boehmite alumina prior to gelling, during the gelling or after the boehmite alumina is sheared. Thus, the stabilizer can be added to the boehmite alumina prior to the boehmite alumina being worked or after the boehmite alumina is worked. For example, the worked boehmite alumina can be dried and the stabilizer added to the dried, worked beohmite alumina. In an alternative embodiment of the present invention, the worked boehmite alumina can be dried and calcined to produce a calcined product, i.e. $Al_2O_3$, and the stabilizer added to the calcined product. The stabilizer will be added in an amount sufficient to decrease loss of porosity of a calcined alumina which is subjected to elevated temperatures. In general, the amount of the stabilizer added will be such as to provide a stabilizer content of from about 0.5 to about 20 weight percent, calculated as the oxide, e.g. barium oxide, based on $Al_2O_3$ whether in the boehmite alumina or in the calcined product.

It is believed that the unexpected stability of alumina prepared according to the process of the present invention results from the fact that the starting material boehmite is comprised of aggregations of individual pseudoboehmite crystallites, the crystallites being of a generally larger size, i.e. from about 50 to about 150 Å in thickness (020 plane), than the conventional boehmite aluminas wherein the individual crystallites are generally about 50 Å and smaller in thickness (020 plane). Further, in the starting material boehmite used in the process of the present invention the individual crystallites are plate-like structures which are generally arranged in an ordered, stacked configuration as can be seen by transmission electron microscopy (TEM). When such an alumina is subjected to working as by shearing, the individual crystallites become more randomly distributed, i.e. the stacks of crystallites are disoriented leaving voids or pores, i.e. greater porosity. This porosity provides for a reactive, accessible surface yielding higher catalytic activity. The incorporation of a stabilizer enhances the structural integrity of the alumina in the sense that when subjected to high temperature, the surface area remains, i.e. the alumina does not collapse upon itself. Thus, to achieve the unexpected, stabilized surface area retention using the process of the present invention, it is necessary to employ, as a starting material alumina, a boehmite alumina which has been prepared in accordance with the process of U.S. Pat. No. 4,676,928 or an equivalent wherein the alumina exists essentially as microgels comprising stacks of plate-like crystallites. Such starting material aluminas can be characterized as being comprised of microgels which are comprised of numerous, associated stacked crystallites on the order of from about 50 to about 150 nm in diameter, the individual crystallite size being, as noted, on the order of from about 50 to about 150 Å in thickness (020 plane).

The process of the present invention can be used to make catalyst supports which retain a high surface area, i.e. about 50 $m^2/g$ or greater upon calcination at 1200° C. for three hours.

To more fully illustrate the present invention, the following non-limiting examples are presented. The DISPAL® aluminas used in the following examples are boehmite aluminas marketed by Vista Chemical Company and made in accordance with the teachings of U.S. Pat. No. 4,676,928. In all cases surface area was obtained by the multi-point BET method.

EXAMPLE 1

A series of samples were prepared by adding a predetermined amount of a 62.8 percent-by-weight lanthanum nitrate hexahydrate solution to a predetermined amount of DISPAL® 18N4-20 alumina sol or DISPAL® 18N4-80 alumina powder. The addition of the lanthanum nitrate solution resulted in gelation of the alumina sol. The alumina/lanthanum nitrate mixture was then worked on a Haake Torque Rheometer. The material was then removed from the rheometer/mixer, dried over night at 70° C., and then fired at 1200° C. for three hours. The firing temperature and time were selected to mimic the conditions that cause loss of surface area and porosity collapse, i.e. conditions a catalyst would experience during use at elevated temperatures such as in a catalytic converter. High surface areas, i.e. about 50 $m^2/g$ or greater, following such treatment at 1200° C. are indicative of a highly stable catalyst support which would retain high surface area and provide improved catalytic activity for longer lifetimes under high temperature extremes. The results are shown in Table 1 below. Sample 1 is a control sample which was not worked but contained stabilizer.

TABLE 1

| Sample | DISPAL ® 18N4-20 | DISPAL ® 18N4-80 Powder | D.I. Water | 62% La(No$_3$) 6H$_2$O | Mixing Time (Minutes) | Mixing Temp (°C.) | RPM | Surface Area (m2/g) |
|---|---|---|---|---|---|---|---|---|
| 1 | 200 | — | — | 5.23 | — | — | — | 28 |
| 2 | 200 | — | — | 5.23 | 20 | 110 | 100 | 58 |
| 3 | 200 | — | — | 5.23 | 20 | 90 | 220 | 56 |
| 4 | 200 | — | — | 5.23 | 7 | 110 | 220 | 46 |
| 5 | 200 | — | — | 5.23 | 20 | 110 | 110 | 57 |
| 6 | — | 45 | 75 | 4.71 | 7 | 80 | 100 | 54 |
| 7 | — | 60 | 60 | 6.28 | 7 | 890 | 100 | 58 |

As can be seen from the data in Table 1, samples prepared in accordance with the process of the present invention wherein the alumina is worked, i.e. sheared, and contains a stabilizer, exhibit high surface area retention, i.e. generally greater than about 50 $m^2/g$ even after being subjected to a temperature of 1200° C. for three hours. This is to be contrasted with Sample 1 in which an unworked alumina containing stabilizer showed a surface area markedly less than 50 $m^2/g$ after being heated to 1200° C. for three hours.

Examples 2–4 which follow demonstrate that retention of high surface area of calcined products is not achieved with conventional boehmite aluminas. In the examples, the CATAPAL® aluminas used are conventional aluminas marketed by Vista Chemical Company which have not been prepared in accordance with the process of U.S. Pat. No. 4,676,928.

EXAMPLE 2

100 g of CATAPAL A® alumina and 452 g deionized water were placed in a Baker-Perkins Muller and sheared for 20 minutes. The resulting material was dried at 66° C. and calcined three hours as 1200° C. The surface area on the calcined product was determined to be 5.8 m²/g.

EXAMPLE 3

25 g of CATAPAL A® alumina, 32 g deionized water and 2.42 g lanthanum nitrate solution (61.1 wt. % lanthanum nitrate) were mixed for 10 minutes and dried at 66° C. The resulting powder was calcined three hours at 1200° C. The resulting calcined product was found to have a surface area of 26.1 m²/g.

EXAMPLE 4

700 g CATAPAL A® alumina, 452 g deionized water and 69.79 g lanthanum nitrate solution (61.1 wt. % lanthanum nitrate) were placed in a Baker-Perkins Muller and sheared for 20 minutes. The resulting material was dried at 66° C. and calcined three hours at 1200° C. The calcined product was found to have a surface area of 42.5 m²/g.

As can be seen from a comparison of the surface area of the calcined products obtained in Examples 2–4, although both working and stabilizing result in a calcined product which retains surface area as contrasted with a CATAPAL A® alumina which has not been worked and/or stabilized, the surface area remains below about 50 m²/g. In this regard, a CATAPAL A® alumina which has not been worked (sheared) or stabilized has a surface area of 4.7 m²/g after calcining for three hours at 1200° C.

The following examples (5–8) demonstrate that when an alumina such as that prepared according to U.S. Pat. No. 4,676,928 is employed, the combination of working and stabilizing results in an end product which retains a surface area of greater than about 50 m²/g even when calcined at 1200° C. for three hours.

EXAMPLE 5

A sample of DISPAL® 18N4-80 alumina powder was calcined three hours at 1200° C. and found to have a surface area of 4.7 m²/g.

EXAMPLE 6

700 g DISPAL® 18N4-80 alumina and 452 g deionized water were placed in a Baker-Perkins Muller and sheared for 20 minutes. The resulting material was dried at 66° C. and calcined three hours at 1200° C. The calcined material was found to have a surface area of 9.1 m²/g.

EXAMPLE 7

100 g DISPAL® 18N4-80 alumina, 100 g deionized water and 2.69 g lanthanum nitrate solution (61.1 wt. % lanthanum nitrate) were mixed for 10 minutes and dried at 66° C. The resulting powder was calcined three hours as 1200° C. The calcined material was found to have a surface area of 35.4 m²/g.

EXAMPLE 8

700 g DISPAL® 18N4-80 alumina, 452 g deionized water and 75.24 g lanthanum nitrate solution (61.1 wt. % lanthanum nitrate) were placed in a Baker-Perkin Muller and sheared for 20 minutes. The resulting material was dried at 66° C. and calcined three hours at 1200° C. The resulting calcined material was found to have a surface area of 52.9 m²/g.

As can be seen from a comparison of Examples 5–8, the combination of working and stabilizing (Example 8) DISPAL® alumina, i.e. aluminas prepared in accordance with the teaching of U.S. Pat. No. 4,676,928, results in a dramatic increase in retained surface area of the final, calcined product, i.e. a surface area of greater than 50 m²/g is obtained even after the material has been subjected to a temperature of 1200° C. for three hours.

EXAMPLE 9

100 g of DISPAL® 18N4-20 alumina and 4.54 g barium acetate powder were mixed for 10 minutes and dried at 66° C. The resulting powder was calcined three hours at 1200° C. The calcined material was found to have a surface area of 63 m²/g.

EXAMPLE 10

700 g of DISPAL® 18N4-80 alumina, 602 g deionized water, and 103.64 g barium acetate powder were placed in a Baker-Perkins Muller and sheared for 20 minutes. The resulting gel was dried at 66° C. and calcined three hours at 1200° C. The calcined material was found to have a surface area of 72.1 m²/g.

As can be seen from Examples 9 and 10, the combination of stabilization with a barium hydrate containing material and working provides a marked increase in retained surface area (compare the surface area of the calcined material from Examples 9 and 10 with the surface area of the calcined materials in Examples 5–7). Although, as can be seen from Example 9, the presence of barium stabilization alone gives a surface area of greater than 50 m²/g, barium presents certain toxicity problems not presented by the use of lanthanum. However, it can be seen that the use of both barium stabilization and working gives sharply increased retained surface area (note Example 10).

EXAMPLE 11

100 g CATAPAL A® alumina, 500 g deionized water, and 12.59 g barium acetate powder were mixed for 15 minutes and dried at 66° C. The resulting powder was calcined three hours at 1200° C. The calcined material had a surface area of 43.4 m²/g.

EXAMPLE 12

700 g CATAPAL® A alumina, 452 g deionized water, and 88.13 g barium acetate powder were placed in a Baker-Perkins Muller and sheared for 20 minutes. The resulting gel was dried at 66° C. and calcined three hours at 1200° C. The calcined material was found to have a surface area of 45.8 m²/g.

As can be seen from the data in Examples 11 and 12, while the addition of stabilizer and working on a conventional boehmite alumina, i.e. an alumina not made in accordance with the teaching of U.S. Pat. No. 4,676,928, results in increased retained surface area, the retained surface area is substantially less than 50 m²/g.

EXAMPLE 13

600 g DISPAL® 18N4-25 alumina sol and 24.90 g aluminum nitrate solution (50 wt. % aluminum nitrate, 50 wt. % deionized water) were mixed to form an alumina gel. The gel was sheared on a Haake Torque Rheometer for 10 minutes at 60° C., 110 rpm. The $Al_2O_3$ content of the sheared gel was 26.8 percent. 53.0 g of the sheared gel, 2.6 g barium acetate powder, and 80.0 g deionized water were mixed for 10 minutes and dried at 66° C. The resulting powder was calcined three hours at 1200° C. The calcined material was found to have a surface area of 67.8 m²/g.

EXAMPLE 14

55.7 g of the sheared gel of Example 13 were dried at 66° C. The resulting dried gel (18 g), 2.77 g barium acetate powder and 80.0 g deionized water were mixed for 10 minutes and dried at 66° C. The resulting powder was calcined three hours at 1200° C. The calcined material was found to have a surface area of 68.7 m²/g.

EXAMPLE 15

52.24 g of the sheared gel of Example 13 were dried at 66° C. The dried gel was calcined two hours at 250° C. followed by 24 hours at 600° C. The resulting material was mixed for 10 minutes with 2.59 g barium acetate powder and 20.0 g deionized water. The slurry was dried at 66° C. and the resulting powder calcined three hours at 1200° C. The calcined material was found to have a surface area of 70.6 m²/g.

EXAMPLE 16

53.0 g of the sheared gel of Example 13, 1.84 g lanthanum nitrate solution (61.1 wt. % lanthanum nitrate), and 80.0 g deionized water were mixed for 10 minutes and dried at 66° C. The resulting powder was calcined three hours at 1200° C. The calcined material was found to have a surface area of 50.2 m²/g.

EXAMPLE 17

55.75 g of the sheared gel of Example 13 were dried at 66° C. The resulting dried gel (18 g), 1.94 g lanthanum nitrate solution, and 80.0 g deionized water were mixed for 10 minutes and dried at 66° C. The resulting powder was calcined three hours at 1200° C. The calcined material was found to have a surface area of 47.7 m²/g.

EXAMPLE 18

52.24 g of the sheared gel of Example 13 were dried at 66° C. The resulting dried gel was calcined two hours at 250° C., followed by 24 hours at 600° C. The resulting material was mixed for 10 minutes with 1.82 g lanthanum nitrate solution (61.1 wt. % lanthanum nitrate) and 20.0 g deionized water. The slurry was dried at 66° C. and the resulting powder calcined three hours at 1200° C. The calcined material was found to have a surface area of 52.2 m²/g.

As can be seen from a comparison of Examples 13–18, the combination of working (shearing) and the use of a stabilizer results in an alumina which, after calcining at 1200° C. for three hours, in general, retains a surface area of greater than about 50 m²/g. As can be seen from these examples, best results are obtained in terms of retained surface area when the worked or sheared gel is first dried and calcined and the stabilizer then added to the calcined material. Compare, for example, the retained surface area obtained by the procedure of Examples 15 and 18. In general, however, the data in Examples 13–18, as well as the other examples, demonstrate that the stabilizer can be added after the gel has been worked, after the gel has been worked and dried, after the gel has been worked, dried and calcined, and the retained surface area still remains above about 50 m²/g.

The foregoing disclosure and description of the invention is illustrative and explanatory thereof, and various changes in the method steps may be made within the scope of the appended claims without departing from the spirit of the invention.

What is claimed is:

1. A process for preparing stabilized alumina comprising:

forming a gel of a treated boehmite alumina, said gel containing from about 15 to about 55 percent-by-weight $Al_2O_3$, said treated boehmite alumina being obtained by hydrothermally treating an aqueous mixture of precursor boehmite alumina and acid for a period of time sufficient to convert the greater portion of said precursor boehmite alumina to a colloidal sol of treated boehmite alumina having a pH of above about 4;

subjecting said gel to a sufficient shearing force at a temperature of from ambient to about 100° C. for a sufficient period of time to increase the pore volume of said treated boehmite alumina in said gel by at least 30% and the median pore radius of said treated boehmite alumina in said gel by at least 20% over that of said boehmite alumina in said gel prior to shearing and produce a worked boehmite alumina; and adding a stabilizer to said boehmite alumina, said stabilizer being selected form the group consisting of an oxide of barium, an oxide of a lanthanide metal, a compound of barium that is converted to an oxide upon heating at an elevated temperature, a compound of a lanthanide metal that is converted to an oxide upon heating at an elevated temperature, and mixtures thereof, said stabilizer being added in an amount sufficient to enhance resistance to loss of surface area of a calcined alumina produced from said worked boehmite alumina.

2. The process of claim 1 wherein an aqueous dispersion of said treated boehmite alumina is formed.

3. The process of claim 1 wherein said stabilizer is added in an amount of from about 0.5 to about 20 percent-by-weight calculated as oxide based on $Al_2O_3$ content of said boehmite alumina.

4. The process of claim 1 wherein said stabilizer is a compound of lanthanum.

5. The process of claim 1 wherein said stabilizer is a compound of barium.

6. The process of claim 1 wherein said stabilizer is added to said boehmite alumina prior to said shearing.

7. The process of claim 1 wherein said stabilizer is added to said boehmite alumina after said shearing.

8. A process for preparing a stabilized, calcined alumina comprising:

forming a gel of a treated boehmite alumina, said gel containing from about 15 to about 55 percent-by-weight $Al_2O_3$, said treated boehmite alumina being obtained by hydrothermally treating an aqueous mixture of precursor boehmite alumina for a period of time sufficient to convert the greater portion of said precursor boehmite alumina to a colloidal sol of said treated alumina having a pH of above about 4;

subjecting said gel to a sufficient shearing force at a temperature of from ambient to about 100° C. for a sufficient period of time to increase the pore volume of said treated boehmite alumina in said gel by at least 30% and the median pore radius of said treated alumina in said gel by at least 20% over that of said boehmite alumina in said gel prior to shearing and produce a worked boehmite alumina;

calcining said worked boehmite alumina to produce a calcined product; and adding a stabilizer to said calcined product, said stabilizer being selected from the group consisting of oxides of barium and lanthanide metals, compounds of barium and lanthanide metals that are converted to oxides upon heating at an elevated temperature, and mixtures thereof, said stabilizer being added in an amount sufficient to enhance resistance to loss of surface area of said calcined product.

9. The process of claim 8 wherein said stabilizer is added in an amount of from about 0.5 to about 20 percent-by-weight calculated as oxide based on $Al_2O_3$ content of said calcined product.

10. The process of claim 8 wherein said stabilizer is a compound of lanthanum.

11. The process of claim 8 wherein said stabilizer is a compound of barium.

* * * * *

UNITED STATES PATENT AND TRADEMARK OFFICE
CERTIFICATE OF CORRECTION

PATENT NO. : 5,593,654
DATED : January 14, 1997
INVENTOR(S) : Lewis B. Decker, Jr.; Kevin J. McLaughlin It is certified that error appears in the above-indentified patent and that said Letters Patent is hereby corrected as shown below:

In column 8, line 56, insert --and acid-- after "alumina".

Signed and Sealed this

Twelfth Day of August, 1997

Attest:

BRUCE LEHMAN

Attesting Officer

Commissioner of Patents and Trademarks